United States Patent
Liem et al.

(10) Patent No.: US 10,545,881 B2
(45) Date of Patent: *Jan. 28, 2020

(54) MEMORY PAGE EVICTION USING A NEURAL NETWORK

(71) Applicant: INTERNATIONAL BUSINESS MACHINES CORPORATION, Armonk, NY (US)

(72) Inventors: Amanda A. Liem, Austin, TX (US); Matthew R. Ochs, Austin, TX (US); Lennard G. Streat, Seneca Falls, NY (US); Brendan M. Wong, Beaumont, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 161 days.

This patent is subject to a terminal disclaimer.

(21) Appl. No.: 15/659,409

(22) Filed: Jul. 25, 2017

(65) Prior Publication Data

US 2019/0034352 A1    Jan. 31, 2019

(51) Int. Cl.
*G06F 12/00*    (2006.01)
*G06F 12/126*    (2016.01)
(Continued)

(52) U.S. Cl.
CPC ........ *G06F 12/126* (2013.01); *G06F 12/0804* (2013.01); *G06F 12/0831* (2013.01);
(Continued)

(58) Field of Classification Search
CPC .... G06F 12/126; G06F 12/0804; G06F 12/12; G06F 3/02

(Continued)

(56) References Cited

U.S. PATENT DOCUMENTS 5,305,389 A * 4/1994 Palmer ............... G06F 12/0862
                                                    382/100
5,495,430 A * 2/1996 Matsunari ........ G05B 19/41865
                                                    703/6

(Continued)

FOREIGN PATENT DOCUMENTS

WO    2012024329    2/2012
WO    2016053313    4/2016

OTHER PUBLICATIONS

Rick Battle, Machine Learning Feature Selection for Tuning Memory Page Swapping, http://calhoun.nps.edu/bitstream/handle/10945/37585/13Sep_Battle_Richard.pdf?sequence=1, last visited Feb. 21, 2017.

(Continued)

*Primary Examiner* — Mark A Giardino, Jr.
(74) *Attorney, Agent, or Firm* — Kunzler Bean & Adamson, PC; Bruce R. Needham

(57) ABSTRACT

An apparatus, method, program product, and system are disclosed for evicting pages from memory using a neural network. A state module determines state information related to evicting pages from memory. The state information may be determined by a dedicated hardware snooping device that snoops a system bus for the state information. A learning module determines an identifier for a page in memory to be evicted using a neural network. The neural network may perform machine learning operations on the state information to identify the page in memory to be evicted. An eviction module locates the identified page in memory using the identifier determined by the neural network and evicts the identified page from memory.

14 Claims, 6 Drawing Sheets

(51) Int. Cl.
*G06F 12/0804* (2016.01)
*G06F 12/12* (2016.01)
*G06F 12/0868* (2016.01)
*G06F 12/0831* (2016.01)
*G06N 3/02* (2006.01)
*G06F 13/00* (2006.01)
*G06F 13/28* (2006.01)

(52) U.S. Cl.
CPC .......... *G06F 12/0868* (2013.01); *G06F 12/12* (2013.01); *G06N 3/02* (2013.01)

(58) Field of Classification Search
USPC ........................................................ 711/154
See application file for complete search history.

(56) References Cited

U.S. PATENT DOCUMENTS

| | | | |
|---|---|---|---|
| 5,704,012 A * | 12/1997 | Bigus | G06F 9/5011 706/19 |
| 6,163,773 A * | 12/2000 | Kishi | G06F 12/121 706/16 |
| 6,567,894 B1 | 5/2003 | Hsu et al. | |
| 6,963,954 B1 | 11/2005 | Trehus et al. | |
| 7,747,824 B2 | 6/2010 | van Riel | |
| 8,635,410 B1 | 1/2014 | Kuskin | |
| 9,971,698 B2 | 5/2018 | Rapoport et al. | |
| 9,990,292 B2 | 6/2018 | Jalal et al. | |
| 2007/0005907 A1 | 1/2007 | Kardach et al. | |
| 2009/0132764 A1 * | 5/2009 | Moll | G06F 1/3203 711/118 |
| 2012/0041914 A1 * | 2/2012 | Tirunagari | G06F 12/121 706/15 |
| 2014/0136792 A1 * | 5/2014 | Frachtenberg | G06F 12/121 711/135 |
| 2014/0195771 A1 | 7/2014 | Adderly et al. | |
| 2016/0196069 A1 | 7/2016 | Kumar et al. | |
| 2016/0253265 A1 | 9/2016 | Rapoport et al. | |
| 2017/0255557 A1 | 9/2017 | Robinson et al. | |

OTHER PUBLICATIONS

Zachary C. Lipton et al., A Critical Review of Recurrent Neural Networks for Sequence Learning, UCSD, Jun. 5, 2015.
Gianluca Dini et al., Caching and prefetching algorithms for programs with looping reference patterns, The Computer Journal Advance Access published Oct. 14, 2005, revised Jul. 14, 2005.
Dharmendra S. Modha, Introducing a Brain-inspired computer, IBM, http://www.research.ibm.com/articles/brain-chip.shtml, last visited Feb. 21, 2017.
Wikipedia, Page replacement algorithm, https://en.wikipedia.org/wiki/Page_replacement_algorithm last visited Feb. 21, 2017.
U.S. Appl. No. 15/796,604, filed Oct. 27, 2017, Office Action dated Nov. 28, 2018.
U.S. Appl. No. 15/796,604, Office Action Summary, filed Oct. 27, 2017, dated May 6, 2019, p. 1-38.

* cited by examiner

MEMORY PAGE EVICTION USING A NEURAL NETWORK

FIELD

The subject matter disclosed herein relates to computer memory and more particularly relates to identifying pages to evict from memory using a neural network.

BACKGROUND

In computers that use paging for memory management, memory pages may be swapped out of memory when a page of memory needs to be allocated. This is often referred to as a page fault. Paging can happen when a page fault occurs and a free page cannot be used to satisfy the allocation, usually because there are no free pages available in memory.

SUMMARY

An apparatus, method, and system for evicting pages from memory using a neural network is disclosed. One embodiment of an apparatus includes a state module that determines state information related to evicting pages from memory. The state information may be determined by a dedicated hardware snooping device that snoops a system bus for the state information. The apparatus includes a learning module that determines an identifier for a page in memory to be evicted using a neural network. The neural network may perform machine learning operations on the state information to identify the page in memory to be evicted. The apparatus includes an eviction module that locates the identified page in memory using the identifier determined by the neural network and evicts the identified page from memory. In various embodiments, at least a portion of the modules include hardware circuits, programmable hardware devices and/or executable code, the executable code stored on one or more computer readable storage media.

One embodiment of a method for evicting pages from memory using a neural network includes determining state information related to evicting pages from memory. The state information may be determined by a dedicated hardware snooping device that snoops a system bus for the state information. The method includes determining an identifier for a page in memory to be evicted using a neural network. The neural network performs machine learning operations on the state information to identify the page in memory to be evicted. The method includes locating the identified page in memory using the identifier determined by the neural network and evicting the identified page from memory.

One embodiment of a system for evicting pages from memory using a neural network includes a dedicated hardware snooping device, a neural network, a memory, and a system bus such that the dedicated hardware snooping device, the neural network, and the memory are communicatively coupled to one another over the system bus. The system includes a state module that determines state information related to evicting pages from memory. The state information may be determined by a dedicated hardware snooping device that snoops a system bus for the state information. The system includes a learning module that determines an identifier for a page in memory to be evicted using a neural network. The neural network performs machine learning operations on the state information to identify the page in memory to be evicted. The system includes an eviction module that locates the identified page in memory using the identifier determined by the neural network and evicts the identified page from memory. In various embodiments, at least a portion of the modules includes hardware circuits, programmable hardware devices and/or executable code, the executable code stored on one or more computer readable storage media.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and shall not be considered to be limiting of scope, the embodiments will be described and explained with additional specificity and detail through the use of the accompanying drawings, in which.

DETAILED DESCRIPTION OF THE INVENTION

Figure 1:
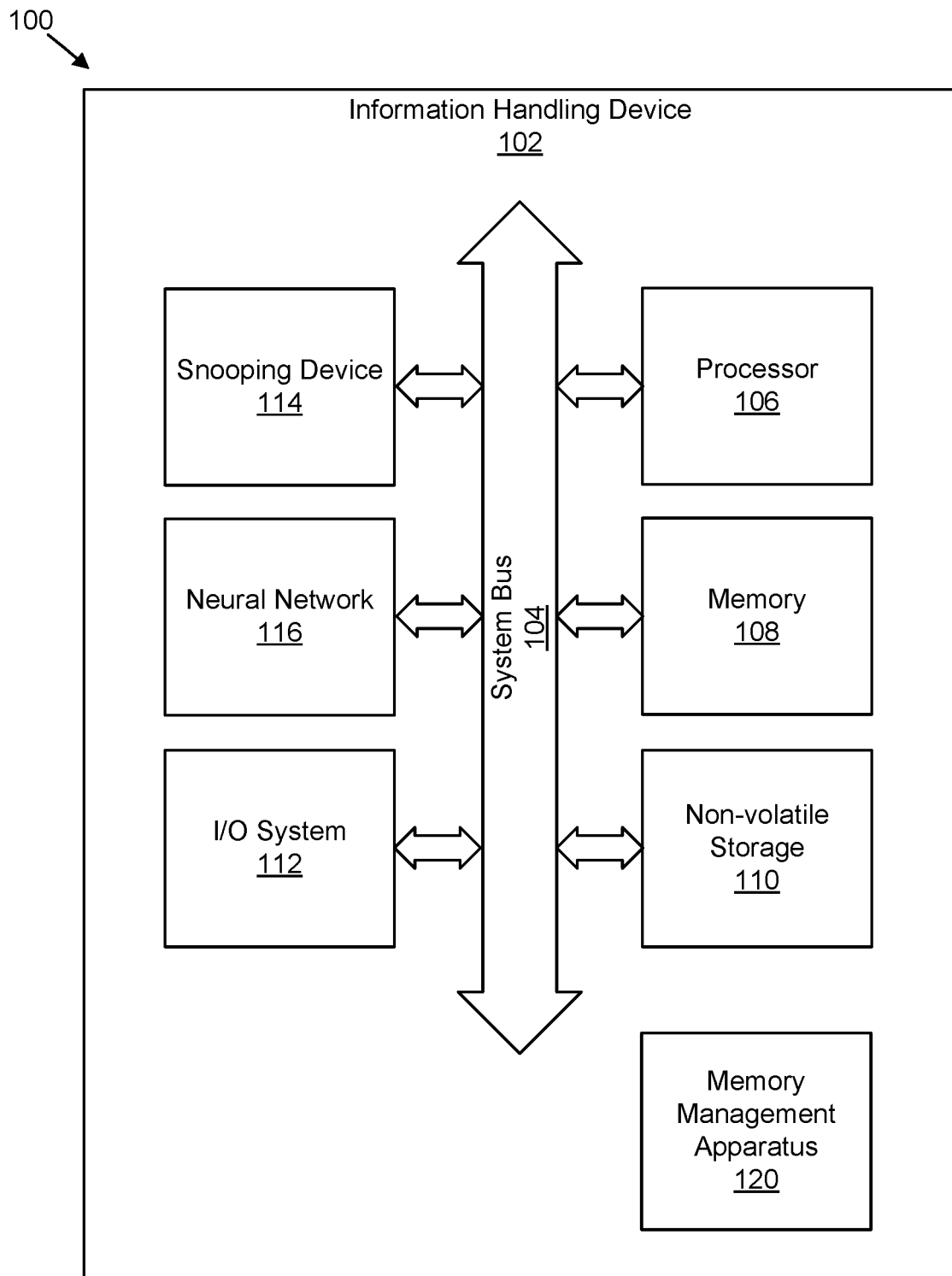
FIG. 1 is a schematic block diagram illustrating one embodiment of a system for memory page eviction using a neural network in accordance with the subject matter disclosed herein.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements.

An apparatus, method, and system for evicting pages from memory using a neural network is disclosed. One embodiment of an apparatus includes a state module that determines state information related to evicting pages from memory. The state information may be determined by a dedicated hardware snooping device that snoops a system bus for the state information. The apparatus includes a learning module that determines an identifier for a page in memory to be evicted using a neural network. The neural network performs machine learning operations on the state information to identify the page in memory to be evicted. The apparatus includes an eviction module that locates the identified page in memory using the identifier determined by the neural network and evicts the identified page from memory. At least a portion of the modules include hardware circuits, programmable hardware devices and/or executable code, the executable code stored on one or more computer readable storage media.

In further embodiments, the state module enables the dedicated hardware snooping device in response to the system bus being enabled. The dedicated hardware snooping device may snoop state information from the system bus until the system bus is disabled. In one embodiment, the learning module continually trains the neural network on the state information in response to receiving the state information such that the neural network identifies the page to evict from memory as a function of trends in historical state information and current state information snooped from the system bus, and continually updates the identifier for the page in memory to be evicted based on new state information that the state module determines using the dedicated hardware snooping device.

In some embodiments, the state module enables the dedicated hardware snooping device for snooping state information from the system bus until the neural network has been trained using state information for a particular workload. The apparatus, in certain embodiments, includes a workload module that detects a change in the workload, enables the dedicated hardware snooping device to snoop new state information from the system bus such that the neural network is re-trained using the new state information, and disables the dedicated hardware snooping device in response to the neural network being trained on the new state information.

In some embodiments, the apparatus includes a sampling module that determines an interval for snooping the system bus for state information using the dedicated hardware snooping device. The interval may be determined based on a rate of page eviction from memory. The state information may be sent to the neural network at the determined interval. In one embodiment, the sampling module determines the interval in real-time based on one or more performance characteristics associated with the system bus, the memory, and/or a processor coupled to the memory.

In various embodiments, the learning module updates the weights of the state information that the neural network uses to determine the identifier for the page in memory to be evicted in response to receiving the state information at the determined interval. In some embodiments, the dedicated hardware snooping device is a hardware accelerator that is separate from, but communicatively coupled to, a processor coupled to the system bus. In certain embodiments, the dedicated hardware snooping device snoops the system bus for data of a predefined type that is associated with a memory transaction of the memory.

In one embodiment, the neural network is a programmable hardware device that is communicatively coupled to the dedicated hardware snooping device and/or a processor. The programmable hardware device may be configured to perform the one or more machine learning operations. In some embodiments, the identifier that is determined by the neural network for the page in memory to be evicted includes a memory location for the page to be evicted, a memory address for the page to be evicted, and/or a pointer to the page to be evicted.

In one embodiment, the state information includes information associated with a memory access transaction. The state information may include a system time, a memory address, a memory command type, and/or a memory command destination. In certain embodiments, the learning module further considers output from one or more predefined page eviction algorithms to determine the page to evict from memory. The predefined page eviction algorithms may include least recently used, most recently used, not recently used, first-in-first-out, second chance, and/or clock.

One embodiment of a method for evicting pages from memory using a neural network includes determining state information related to evicting pages from memory. The state information may be determined by a dedicated hardware snooping device that snoops a system bus for the state information. The method includes determining an identifier for a page in memory to be evicted using a neural network. The neural network performs machine learning operations on the state information to identify the page in memory to be evicted. The method includes locating the identified page in memory using the identifier determined by the neural network and evicting the identified page from memory.

The method, in certain embodiments, further includes enabling the dedicated hardware snooping device in response to the system bus being enabled. The dedicated hardware snooping device may snoop state information from the system bus until the system bus is disabled. The method, in one embodiment, further includes continually training the neural network on the state information in response to receiving the state information such that the neural network identifies the page to evict from memory as a function of trends in historical state information and current state information snooped from the system bus, and continually updating the identifier for the page in memory to be evicted based on new state information that the state module determines using the dedicated hardware snooping device.

The method, in various embodiments, further includes enabling the dedicated hardware snooping device for snooping state information from the system bus until the neural network has been trained using state information for a particular workload. The method, in one embodiment, further includes detecting a change in the workload, enabling the dedicated hardware snooping device to snoop new state information from the system bus such that the neural network can be re-trained using the new state information, and disabling the dedicated hardware snooping device in response to the neural network being trained on the new state information.

One embodiment of a system for evicting pages from memory using a neural network includes a dedicated hardware snooping device, a neural network, a memory, and a system bus such that the dedicated hardware snooping device, the neural network, and the memory are communicatively coupled to one another over the system bus.

The system includes a state module that determines state information related to evicting pages from memory. The state information may be determined by a dedicated hardware snooping device that snoops a system bus for the state information. The system includes a learning module that determines an identifier for a page in memory to be evicted using a neural network. The neural network performs machine learning operations on the state information to identify the page in memory to be evicted. The system includes an eviction module that locates the identified page in memory using the identifier determined by the neural network and evicts the identified page from memory. In various embodiments, at least a portion of the modules includes hardware circuits, programmable hardware devices and/or executable code, the executable code stored on one or more computer readable storage media.

FIG. 1 depicts one embodiment of a system 100 for memory page eviction using a neural network. In certain embodiments, the system 100 includes an information handling device 102 that includes one or more of system buses 104, processors 106, memory 108, non-volatile storage devices 110, I/O system devices, and/or the like. Furthermore, as described in more detail below, the information handling device 102 may include snooping devices 114, neural networks 116, and/or memory management apparatuses 120.

In one embodiment, the information handling device 102 includes a desktop computer, a laptop computer, a tablet computer, a smart phone, a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, and/or another computing device that includes a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device).

In some embodiments, the information handling device 102 includes a system bus 104. As used herein, the system bus 104 is a communication bus that connects the various components of the information handling device such as the processor 106, memory non-volatile storage devices 110, I/O devices 112, snooping devices, 114, neural networks 116, and/or the like. The system bus 104, in certain embodiments, combines the functions of a data bus to carry information, an address bus to determine where the information should be sent, and a control bus to determine the operation of the information. For instance, as described in more detail below, the system bus 102 may transmit data for memory transactions (read, write, etc.) including the data, the memory address for the data, and the operation to be performed on the data. Even though only a single system bus 104 is depicted in FIG. 1, the information handling device 102 may include multiple different system buses 104.

The processor 106, as used herein, is an integrated or electronic circuit that performs operations on data from a data source, such as memory 108 or some other data stream. In certain embodiments, the processor 106 is a central processing unit ("CPU") for the information handling device 102, and is configured to carry out the instructions of a computer program by performing the basic arithmetic, logical, control and input/output (I/O) operations specified by the instructions. A processor 106 may include multiple processing cores or processing units. Similarly, the information handling device 102 may include multiple processors 106 or processing units.

The memory 108, as used herein, may include volatile memory media, which may include, but is not limited to random access memory ("RAM"), dynamic RAM ("DRAM"), cache, or the like. In such an embodiment, the memory 108 may be used to store frequently used program instructions, data, and/or the like, which may be read into memory 108 from a secondary storage, e.g., a non-volatile storage device 110, in blocks or pages of a predefined size. Thus, as used herein, a page of memory is a fixed-length, contiguous block of virtual memory (mapped virtual memory addresses to physical memory addresses). Pages may be tracked or managed in page table (table of mappings of virtual memory addresses to physical memory addresses), and may be transferred between memory 108 and non-volatile storage devices 110, which is referred to as paging or swapping.

The non-volatile storage device 110, as used herein, may include one or more non-volatile memory media, which may include, but is not limited to NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The I/O system 112, as used herein, may include one or more I/O buses, devices, and/or the like for providing input/output operations for the information handling device 102. For instance, the I/O system 112 may include an I/O bus, a video card, a sound card, a network card, a microphone, a keyboard, a mouse, a touch-enabled display, a display device, a printer, a camera, and/or the like. Data sent to/from the I/O system 112 may be transmitted over the system bus 102.

The snooping device 114, in one embodiment, is configured to snoop, sniff, read, listen, monitor, track, collect, and/or the like data that is transmitted on the system bus 104. In certain embodiments, the snooping device 114 uses a bus snooping protocol to snoop data on the system bus 104. In one embodiment, the snooping device 114 snoops for specific data messages, information, packets, or the like such as memory access transactions that are associated with the memory 108. For instance, the snooping device 114 may be configured to snoop system bus information and filter the information for data associated with a memory read or write transaction. The data may include state information such as a command type (e.g., read/write command), a command destination (e.g., a storage location, a memory address, an application, or the like), the data being transmitted, the type of data being transmitted, and/or the like.

In certain embodiments, the snooping device 114 is a special-purpose, dedicated hardware device that is specially configured to snoop data on the system bus 104. For example, the snooping device 114 may be specially programmed, hard-coded, or loaded with firmware that is specifically designed for snooping the system bus 104, such as an FPGA device, an ASIC device, and/or the like. In another example, the snooping device 114 may have specially designed circuitry, or the like, such that the snooping device 114 is hard-wired for snooping the system bus 104.

In certain embodiments, the snooping device 114 is "always-on," meaning that the snooping device 114 is enabled, activated, turned-on, or the like when the information handling device 102, the system bus 104, the processor 106, the memory 108, or the like is enabled, activated, turned-on, or the like. In this manner, the snooping device 114 snoops data from the system bus 104 when the processor 106 begins processing a workload and the memory 108 is accessed for data reads and writes. Accordingly, because the snooping device 114 snoops data on the system bus 104 when the information device 102 is first turned-on or activated, a more full and accurate picture of the memory transactions associated with the memory 108 can be captured. Consequently, the snooping device 114 may not require any configuration or other communication from an operating system or other applications running on the information handling device 102 because the snooping device 114 is configured to be always-on and snooping data from the system bus 104 while the information handling device 102 is enabled.

In certain embodiments, the snooping device 114 may be enabled/disabled, activated/inactivated, turned on/turned off, or the like as needed, on the fly, in real-time, or the like. For example, to reduce processing or system overhead, the snooping device 114 may be disabled for a particular workload that has been running for a predetermined amount of time. However, the snooping device 114 may be enabled when the workload running on the information handling device 102 changes, for example.

In some embodiments, the snooping device 114 is configurable. For example, the snooping device 114 may be configured by an operating system, an application, a controller, a user, and/or the like. For instance, the snooping device 114 may be flashed or loaded with new firmware that defines how the snooping device 114 snoops data from the system bus 104. The snooping device 114, in some embodiments, may be configured to snoop all data from the system bus, data of a particular type, data associated with a particular operation, data that is sent from a particular source or intended for a particular destination, data associated with a particular address or location, and/or the like.

In one embodiment, the snooping device 114 is separate from the processor 106, or processing unit. For example, the snooping device 114 may be a separate integrated circuit, die, chip, or the like that is communicatively coupled to, but not integrated with or otherwise part of the processor 106. In such an embodiment, the snooping device 114 may be embodied as a hardware accelerator, which, as used herein, may enable the snooping device 114 (as a special-purpose, dedicated hardware device for snooping the system bus 104) to perform certain functions, e.g., system bus snooping, more efficiently than the processor 106. In various embodiments, the snooping device 114 is a part of the processor 106 or processing unit. For example, the snooping device 114 may be integrated with, coupled to, or otherwise located on the same chip, die, die plane or the like of the processor 106.

The neural network 116, in one embodiment, is configured to perform one or more machine learning operations on data to forecast or otherwise make predictions about the data. For example, the neural network 116 may perform machine learning operations on the memory access data described above that the snooping device 114 snoops on the system bus 104 to make predictions on the data in memory 108, such as page eviction predictions.

Similar to the snooping device 114, the neural network 116 may be a special-purpose, dedicated hardware device that is specially configured to perform machine learning operations on data snooped from the system bus 104. For example, the neural network 116 may be specially programmed, hard-coded, or loaded with firmware that is specifically designed for performing machine learning operations, such as an FPGA device, an ASIC device, a hardware accelerator, and/or the like (e.g., a neural processing unit that includes an AI accelerator chip and a software API). In another example, the neural network 116 may have specially designed circuitry, or the like, such that the neural network 116 is hard-wired for performing machine learning operations. In various embodiments, the neural network 116 may be embodied as executable code that is executable by the processor 106, or other processing device to perform machine learning operations.

As with the snooping device 114, the neural network 116 may be "always-on," meaning that the neural network 116 is enabled, activated, turned-on, or the like when the information handling device 102, the system bus 104, the processor 106, the memory 108, the snooping device 114, or the like is enabled, activated, turned-on, or the like. In this manner, the neural network 116 performs machine learning operations on data that the snooping device 114 snoops from the system bus 104 to make various predictions for the information handling device 102, and its components, based on the snooped data. Consequently, the neural network 116 may not require any configuration or other communication from an operating system or other applications running on the information handling device 102 because the neural network 116 is configured to be always-on and processing machine learning operations on data snooped from the system bus 104 while the information handling device 102 is enabled.

In certain embodiments, the neural network 116 may be enabled/disabled, activated/inactivated, turned on/turned off, or the like as needed, on the fly, in real-time, or the like. For example, to reduce processing or system overhead, the neural network 116 may be disabled for a particular workload that has been running for a predetermined amount of time. However, the neural network 116 may be enabled when the workload running on the information handling device 102 changes, for example.

In some embodiments, the neural network 116 is configurable. For example, the neural network 116 may be configured by an operating system, an application, a controller, a user, and/or the like. For instance, the neural network 116 may be flashed or loaded with new firmware that defines different machine learning operations or algorithms that the neural network 116 performs on the data that is snooped from the system bus 104. For example, the neural network 116 may be configured as an artificial neural network (e.g., a neural network that uses "weights" to change parameters, variables, or the like of a fitness function to perform a best fit linear regression given the various inputs from the snooped data), such as a feed-forward artificial neural network, a multi-layer perceptron neural network, a support vector machine, and/or the like, to analyze the data using complex models, deep learning, and algorithms that lend themselves to prediction through historical relationships and trends in the data. One of skill in the art will recognize, in light of this disclosure, the various neural networks and machine learning operations/algorithms that may be implemented herein.

In one embodiment, the neural network 116 is separate from the processor 106, or processing unit, and/or the snooping device 114. For example, the neural network 116 may be a separate integrated circuit, die, chip, or the like that is communicatively coupled to, but not integrated with or otherwise part of the processor 106. In such an embodiment, the neural network 116 may be embodied as a hardware accelerator, which, as used herein, may enable the neural network 116 (as a special-purpose, dedicated hardware device for performing machine learning operations) to perform certain functions, e.g., machine learning operations, more efficiently than the processor 106. In various embodiments, the neural network 116 is a part of the processor 106 or processing unit. For example, the neural network 116 may be integrated with, coupled to, or otherwise located on the same chip, die, die plane or the like of the processor 106.

The memory management apparatus 120, in one embodiment, is configured to determine state information for the information handling device 102 based on data snooped from the system bus 104, provide the data to a neural network 116, which performs machine learning operations on the data to identify or predict the next page in memory 108 to be evicted, and then locate and evict the identified page from memory 108. The memory management apparatus 120 includes one or more modules for performing the various operations of the apparatus 120. The various modules may be embodied as hardware circuits, programmable hardware devices, and/or executable code that is stored on computer readable storage media. The various modules may be communicatively coupled to the system bus 104, may be part of other hardware devices or modules that are communicatively coupled to the system bus 104, and/or the like. The memory management apparatus 120, including its various modules, is described in more detail below.

In certain embodiments, the memory management apparatus 120 provides an improvement to computing technology by predicting a page to be evicted from memory 108 based on state information that is collected in real-time from a system bus 104 using a dedicated hardware snooping device 114 and a neural network 116 that performs machine learning operations on the state information to determine the best page to evict from memory 108 according to historical data and trends in the state information. In certain embodiments, using a neural network 116 and machine learning operations to predict the best page to evict from memory 108 is more dynamic and accurate than conventional page eviction algorithms because it operates on real-time state information. Furthermore, using a dedicated hardware snooping device 114 to snoop the system bus 104 and/or a dedicated hardware neural network 116 to perform machine learning operations on the snooped data may be more efficient than using the processor 106 to perform these operations and may reduce the overhead on the processor 106 and the overall information handling device 102.

Figure 2:
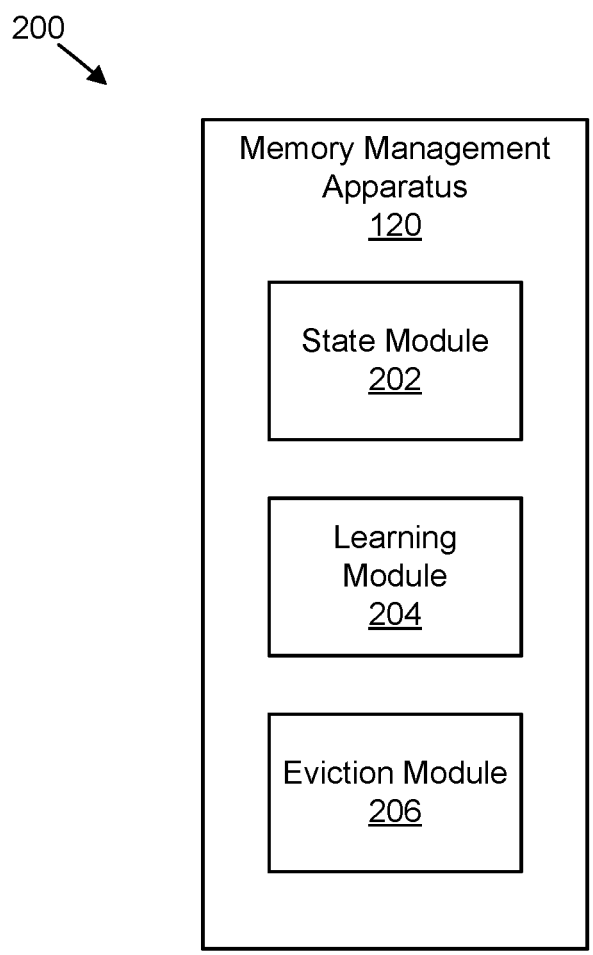
FIG. 2 is a schematic block diagram illustrating one embodiment of an apparatus for memory page eviction using a neural network in accordance with the subject matter disclosed herein.

FIG. 2 depicts one embodiment of an apparatus 200 for memory page eviction using a neural network. The apparatus 200 includes an instance of a memory management apparatus 120. The memory management apparatus 120 includes one or more of a state module 202, a learning module 204, and an eviction module 206, which are described in more detail below.

In one embodiment, the state module 202 determines state information related to one or more pages of data in memory 108. The state module 202, for instance, may receive state information as part of memory transaction data that the snooping device 114 snoops on the system bus 104. The state information, for example, may include a memory address, a memory command type, a memory command destination, a process identifier, an application identifier, and/or the like. The state information may describe, define, be associated with, be related to, and/or the like eviction of a page from memory 108.

For example, the state module 202 may enable the snooping device 114 when the system bus 104 is enabled, or at substantially the same time as when the system bus 104 is enabled. The snooping device 114 may snoop, sniff, intercept, read, and/or the like, the system bus 104 for any data packets that include state information in the form of commands, operations, parameters, variables, addresses, locations, and/or the like that are associated with memory access transactions, e.g., data packets that include state information associated with the memory 108, are sent to/from the memory 108, are associated with reading data stored on the memory 108, are associated with writing data to the memory 108, and/or the like. The snooping device 114 may continue snooping the system bus 104 for memory access transaction data packets until the system bus 104 is disabled (e.g., if the information handling device 102 is turned off, placed in hibernation, or the like; if communications on the system bus 104 are paused, halted, or the like; and/or the like such that the snooping device's 114 access to the system bus 104 is disabled, gated, paused, halted, or the like), until the state module 202 disables the snooping device 114, and/or the like.

In certain embodiments, the snooping device 114 snoops all data packets from the system bus 104. In such an embodiment, the state module 202 receives or otherwise accesses the snooped data packets as raw data and examines and/or filters the raw data packets for any data packets that are of interest to the state module 202, e.g., data packets that are associated with or contain state information for memory access transactions on the memory 108. In a further embodiment, the state module 202 directs, commands, or otherwise specifies to the snooping device 114 the types of data packets to snoop, collect, or otherwise monitor for, which may be associated with memory access transactions on the memory 108.

In one embodiment, the state module 202 is part of or otherwise located on the snooping device 114. For example, the state module 202 may be embodied as at least part of the firmware for the snooping device 114, as a specially programmed chip or other logic hardware device located on the same die or die plane as the snooping device 114, and/or the like. In another embodiment, the state module 202 is separate from, but in communication with, the snooping device 114. For example, the state module 202 may be embodied as software as part of the operating system for the information handling device 102, as part of an application executing on the information handling device 102, as a separate specially programmed chip or other logic hardware device that is communicatively coupled to the snooping device 114, and/or the like.

In certain embodiments, the state module 202 receives, stores, checks, references, looks up, and/or the like other state information associated with the information handling device 102, but not necessarily captured from the system bus 104 by the snooping device 114. For instance, the state module 202 may determine the system time when a packet is snooped from the system bus 104, when the state information is sent to the neural network 116 (described below), at predetermined intervals, and/or the like.

In a further embodiment, the state module 202 determines other state information that may affect how data is paged from memory 108 such as processor performance characteristics (processor clock rate, temperature, or the like), memory access rates, page eviction rates, virtual memory usage statistics, I/O rates, an identifier for the last page evicted from memory 108, a time period since the last page was evicted from memory 108, an identifier for the system bus 104 master, latent bus architecture features (e.g., memory cast out indices, requests that receive combined responses or partial responses), a number of evictions per group of X pages in the page table within some fixed sampling window, and/or the like, which may affect one or more pages of data in memory 108.

In certain embodiments, the state module 202 sends the state information to the neural network 116, or otherwise makes the state information available to the neural network 116. In some embodiments, the state module 202 encodes the state information for the neural network 116. The state module 202, for example, may encode the data using a predefined encoding algorithm such as principle component analysis ("PCA"), linear discriminate analysis ("LDA"), or the like. The state module 202 may encode the state information using any encoding algorithm that the neural network 116 is configured to decode.

In one embodiment, the learning module 204 is configured to determine an identifier for a page in memory 108 to be evicted using a neural network 116. As described above, the neural network 116 may be embodied as an artificial neural network, a multi-layer perceptron, or the like that is configured to perform one or more machine learning operations on the state information that the state module 202 provides (as collected by the snooping device 114) to identify, predict, forecast, locate, and/or the like one or more pages in memory 108 to be evicted in the event of a page fault.

In one embodiment, the learning module 204 is part of or otherwise located on the neural network 116. For example, the learning module 204 may be embodied as at least part of the firmware for the neural network 116, as a specially programmed chip or other logic hardware device located on the same die or die plane as the neural network 116, and/or the like. In another embodiment, the learning module 204 is separate from, but in communication with, the neural network 116. For example, the learning module 204 may be embodied as software as part of the operating system for the information handling device 102, as part of an application executing on the information handling device 102, as a separate specially programmed chip or other logic hardware device that is communicatively coupled to the neural network 116, and/or the like.

Thus, in certain embodiments, the learning module 204 is part and parcel of the neural network 116 to determine an identifier for the page in memory 108 to be evicted. In another embodiment, the learning module 204 is separate from the neural network 116 and provides inputs to (e.g., state information) and processes results from the neural network 116 to identify the page to be evicted from memory 108. For instance, the learning module 204 may receive results from the neural network 116 that require additional processing, such as address mapping, translation, etc. to identify the page in memory 108 to be evicted. Alternatively, the neural network 116 may determine the identifier for the page to be evicted from memory 108, and the learning module 204 may send or forward the determined identifier to the eviction module 206.

For instance, the neural network 116 may process different permutations of data, e.g., the state information associated with the memory 108, using machine learning and analyze the machine learning results to determine one or more optimal pages of data to evict from memory 108. Machine learning, as used herein, comprises one or more modules, computer executable program code, logic hardware, and/or other entities configured to learn from or train on input data, e.g. historical state information, and to apply the learning or training to provide results or analysis for subsequent data, e.g., determining which page to evict from memory 108 based on subsequent/current state information. One embodiment of machine learning is a plurality of learned functions, which may comprise a predictive program with predictive program code directed to determining a page in memory 108 to evict based on the state information. Different learned functions may be from different machine learning or predictive classes, or the like, and may be selected from a larger plurality of generated learned functions.

In one embodiment, the state module 202 makes the state information accessible to the learning module 204. For instance, the state module 202 may send the state information to the learning module 204 at predetermined intervals. In such an embodiment, the state module 202 and the learning module 204 may communicate over the system bus 104, or another bus, using a bus communication protocol. In another example, the state module 202 may store the state information in shared memory, or other storage location, that is accessible to both the state module 202 and the learning module 204.

In one embodiment, the learning module 204 dynamically manipulates one or more machine learning inputs, parameters, weights, results, and/or the like of the neural network 116 based on, as a function of, or in response to received or accessed state information that the state module 202 provides. In one embodiment, a machine learning weight or parameter comprises an input and/or an output of the machine learning that is adjustable, configurable, and/or the like based on received state information. The results of the machine learning processing of the neural network 116, in certain embodiments, includes an input and/or output of the machine learning based on the adjusted machine learning weight, e.g., an identifier for a page in memory 108 to be evicted.

In certain embodiments, the neural network 116 generates a plurality of predictive outcomes or other machine learning results from a data set that includes a plurality of instances of state information, e.g., different sets of historical state information. By using historical state information data sets to understand the interactions between the memory 108 and various memory clients such as non-volatile storage devices 110, operating systems, applications, and/or the like, the neural network 116 may achieve a level of confidence in using the historical state information to determine a page to evict from memory 108 based on recognized patterns, predicted events, or the like in the state information using machine learning.

The neural network 116 may process each instance of state information within the data set to generate a new set of machine learning results, e.g., a set of pages to be evicted from memory 108, which may be ranked in order of priority of eviction. The neural network 116 may perform this processing of data iteratively for each instance, deriving a new set of machine learning results for each iteration. The accumulation of each of the machine learning results gathered after processing each of the different instances by the neural network 116 may populate a table or other results data structure of predictive, machine learning information (e.g., machine learning inputs, machine learning results, and/or other machine learning parameters) that is pre-processed and readily accessible by the neural network 116, for example, in response to a page fault.

The learning module 204 and/or the state module 202, as mentioned above, may encode the state information using a predefined encoding scheme for the neural network 116. For example, the neural network 116 may maintain one or more matrices that contain values representing parameters or weights for each characteristic of the state information for each page of data in memory 108 that corresponds to the encoded state information.

In such an embodiment of the neural network 116, the state module 202 and/or the learning module 204 may encode the state information so that the state information is represented as a vector, an array, a matrix, a column, a row, or the like of values, e.g., integers, whole numbers, real numbers, etc., such that the neural network 116 can perform matrix operations on the encoded state information. For example, the state module 202 and/or the learning module 204 may map, translate, or the like the state information, such as memory addresses that are accessed, memory access types, memory access destinations (e.g., applications, storage devices, processors, etc.), the system time, or the like to a particular value, weight, and/or a position within the encoded vector, matrix, or the like.

Furthermore, the learning module 204 may determine a page to be evicted from memory 108 based at least in part on one or more predefined page eviction algorithms, as one of skill in the art would be familiar with. The predefined page eviction algorithms may include a least recently used algorithm, a most recently used algorithm, a not recently used algorithm, a first-in-first-out algorithm, a second chance algorithm, a clock algorithm, and/or the like. The learning module 204 may further encode the page eviction result(s) from each of these algorithms (e.g., a memory address, a memory location, or the like that indicates which page should be evicted from memory 108) and provide the encoded result(s) to the neural network 116.

However, in certain embodiments, unlike the predefined or conventional page eviction algorithms, the use of a neural network 116 and machine learning operations that are performed on current, real-time state information snooped from the system bus 104 provides a more dynamic and accurate picture of the interactions between the workload executing on the system and the memory 108. The neural network 116 may learn, over time, based on the snooped state information, how the memory 108 is interacted with, which applications, services, programs, processes, or the like use the data in memory 108, how the data in memory 108 is used, when the data in memory 108 is used, and/or the like. Accordingly, the neural network 116 may be able to predict, forecast, or the like an optimal or best page to evict from memory 108 based on historical trends in the state information, which the neural network 116 may be trained on, and current state information. In other words, in some embodiments, the neural network 116 provides an intelligent way to identify a page to evict from memory 108 (by learning from the state information how or when the pages in memory 108 are actually accessed or used) in response to a page fault that goes beyond merely basing the decision only on guessing, random selection, frequency of use, the number of times that a page is referenced, how long a page has been in memory 108, the order that the pages were paged into memory 108 (e.g., first-in-first-out, etc.), and/or the like.

The neural network 116 may process or analyze the encoded state information and page eviction algorithm result(s) information, using one or more machine learning algorithms, to determine, predict, forecast, or the like the best page of data to evict from memory 108 in the event of a page fault. Continuing with the example above, the neural network 116 may perform various matrix operations using the matrix of state information/weights for each page and the encoded state information/page eviction algorithm result(s) to determine a page in memory 108 to evict, a list of pages to evict from memory 108, an ordered or ranked list of pages to evict from memory 108, and/or the like. For instance, the neural network 116 may calculate one or more results and translate, map, or the like the results to one or more identifiers for one or more pages in memory 108 such as one or more memory addresses, one or more memory locations, one or more pointers to memory locations/addresses, and/or the like for one or more pages to be evicted from memory 108.

To illustrate how the neural network 116 determines a page to evict from memory 118 given the various sets of inputs, the following is an example of a multi-layer perceptron network. Even though a particular example of a neural network 116 is described, one of skill in the art will recognize, in light of this disclosure, the various neural network types and machine learning algorithms that may be used to identify a page to evict from memory 108 based on state information snooped from the system bus 104 and page eviction algorithm result(s) information.

In one example embodiment, the neural network 116 receives various inputs that are encoded into a numerical format and placed into a vector of length N. For instance, the neural network 116 may receive the following inputs encoded as a vector:

a. Time of day—an integer (e.g., 32 bits in order to get a tenth of a millisecond granularity)
b. Memory address—integer (e.g., 64-bit, 32-bit, or the like)
c. Command type—integer; enumeration of a machine code command
d. Last evicted page—integer; index of the last evicted page from the table
e. Time since last eviction—integer
f. Least recently used algorithm output—integer; index of page that the LRU algorithm expects to be evicted
g. First-in-first-out algorithm output—integer; index of page that the FIFO algorithm expects to be evicted h. Bus master—integer; ID used to indicate the command source
i. Latent bus architecture features—memory cast out indices, requests that receive combined responses, partial responses, etc.
j. Number of evictions per group of X pages in the page table within some fixed sampling window—vector The state module 202 may take the foregoing ten inputs and put at least a portion of the inputs into a vector A (either a row vector or a column vector), where $A_i$ is the $i^{th}$ element in the vector. Let n be the number of features in the A vector. An example of the A vector may be as follows:

[80157015, 0x1214091, 0x0115, 240590, 70101500, 240600, 240000, 0x1204], which corresponds to the following inputs:

[time, address, cmd type, last evicted index, time since last, LRU, FIFO, bus mstr]

Furthermore, the state module 202 may aggregate state information collected by the snooping device 114 and other state information over time. Thus, given that A is a vector of state information inputs, the state information inputs may be aggregated over time by sampling or capturing state information for A at different times, t. The aggregated state information may form a matrix X that is a concatenation of various vectors $A^t$: $=[A^t|A^{t-1}|A^{t-2}| \ldots |A^{t-k}]$. The state module 202 may continue to update matrix X by shifting each vector $A^t$ forward at the next sampling point. Whenever the neural network 116 needs or requests data, or whenever data is sent to the neural network 116 at the predefined intervals, the state module 202 sends matrix X to the neural network 116 and/or to the learning module 204, and/or sends vectors A of inputs to the neural network 116, which updates matrix X to include the new input vectors A.

In certain embodiments, the state module 202, prior to sending the vectors A or matrix X to the neural network 116, normalizes or standardizes values of the input vectors A, which may make training the neural network 116 faster and reduce the chances of getting stuck in a local optima (local min or max). In a further embodiment, the state module 202 maintains a "trainable" parameter for scaling each of the time-sliced input vectors $A^t$ to apply weighing to the inputs based upon when it was received (e.g., older input vectors may be given a lower weight than more recent input vectors). This results in the matrix $\lambda X^T$, where lambda $\lambda$ is a diagonal matrix. Note that the "T" is there to indicate a matrix transpose operation, which may be necessary because of how the X matrix is defined.

Consequently, multiplying $X^T$ by a diagonal matrix $\lambda$ effectively computes the following: $[\lambda^t A^t | \lambda^{t-1} A^{t-1} | \lambda^{t-2} A^{t-2} | \ldots | \lambda^{t-k} A^{t-k}]$. Assume that $\lambda^t > \lambda^{t-1} > \ldots \lambda^{t-k}$ would be an example of a reasonable constraint, which may not be required, but is just one reasonable solution. $\lambda$ is an example of a latent model parameter and is one of the internal neural network parameters that may need to be learned. At this point then, $X^T$ is the encoded input that the state module 202 generates.

In most implementations of neural networks 116, matrix operations are used to represent the "neural network" model. This may be because matrix operations can be efficient programming models to represent the underlying operation that is being computed by each of the nodes (a node is another way of saying "neuron").

The state module 202 may provide the encoded input matrix $X^T$ to the neural network 116 directly or via the learning module 204. The neural network 116, in this example the multi-layer perceptron, may multiply the input matrix $X^T$ by a weight matrix W that defines weights for each of the corresponding values in the input matrix $X^T$ (e.g., each column of W may contain the synaptic weights associated with one "neuron/node." The weight matrix W may include various values for the weights, but is typically constrained to have all weight values bounded between 0 and 1. The neural network 116 may compute a dot produce to apply the weights in W to the "neurons" in the input matrix $X^T$.

Next, the neural network 116 may compute an activation function on the result of the dot product of $X^T W$. As used herein, the activation function of a node defines the output of that node given an input or set of inputs. Thus, the neural network 116 passes the result of the dot product of $X^T W$ to the activation function S, which results in the output from the first layer of the neural network 116: $H_k = S(X^T W)$. The matrix $H_k$ is the matrix of the internal output calculated from the $k^{th}$ layer of the neural network 116. This is then fed to the next internal (e.g., "hidden") layer in the neural network 116. This output is then fed as the "input layer" to the next layer in the neural network 116, and the process repeats. At the last hidden layer, the output may be fed to an output layer network, which decodes the output into a multi-bit vector, depending on how many output bits are needed by the model.

To generate an output vector using the $H_k$ matrix, the neural network 116 feeds the $H_k$ matrix to the output layer of the multi-layer perceptron, and selects the dimensions of the output layer for the output vector. For instance, the neural network 116 may take the $H_k$ matrix and flatten it into a vector and then operate on it. The output from the output layer, $Y^t$, for example, may be an index to the page to be evicted (e.g., the output vector may be a vector of binary values calculated using sigmoid functions where each value is an index to a page in memory 108, and the value may indicate whether the page should be evicted or not).

Referring again to FIG. 2, in one embodiment, the learning module 204 receives state information from the state module 202 at predefined intervals or in response to the snooping device 114 snooping new state information from the system bus 104. When state information is received from the state module 202, the learning module 204 may provide it to the neural network 116 so that the neural network 116 can analyze the new state information using machine learning operations and update the page eviction identifier(s), update its internal weights used to process the state information, and/or the like.

In some embodiments, the learning module 204 requests state information from the state module 202 in response to a page fault. In such an embodiment, the snooping device 114 may not snoop information from the system bus 104 until a request for state information is received. In another embodiment, the snooping device 114 may snoop data from the system bus 104, but the state module 202 may not make the state information accessible to the learning module 204 until the learning module 204 request the data. In a further embodiment, the state module 202 may store the state information in a shared memory location, and the learning module 204 may access or read the state information in response to a page fault.

In one embodiment, the learning module 204 trains the neural network 116 using the state information and various learning rules such as multi-layer perceptron back-propagation, or the like. In some embodiments, the learning module 204 trains the neural network 116 by generating rules that indicate whether the neural network's 116 predictions, output, results, or the like, were incorrect, erroneous, wrong, or the like, and then updates the weights of the neural network 116 to increase the accuracy of the neural network 116. In certain embodiments, when the learning module 204 receives state information from the state module 202, the neural network 116 updates its weights and determines identifiers for the page(s) to evict from memory 108. In another embodiment, the neural network 116 may not update its weights and/or the identifiers for the page(s) to be evicted until a page fault is detected, until a request for the page identifiers is received, and/or the like.

In various embodiments, the learning module 204 generates a cost function that used during training of the neural network 116 with the goal of minimizing the cost function. For example, the cost function may indicate which bits in the output vector were wrong and to what extent, e.g., the "wrong-ness," which is then fed back to the weight matrix and is used to update the weights of the nodes that contributed to the incorrect result in proportion to the degree that they contributed to the incorrect result. In another example, the cost function may be defined by indicating that the algorithm selected a bad page for eviction. The degree to which the algorithm was incorrect may be measured by taking the XOR difference between the page selected by the algorithm and any page that was evicted by demand in a time period after the first eviction. During training, the learning module 204 may adjust, modify, and/or the like various learned parameters such as a latent model parameter, the weights of a weight matrix, and/or the like.

In one embodiment, the eviction module 206 receives the identifier for the page in memory 108 to be evicted and locates the identified page in memory 108 from the learning module 204 and/or the neural network 116. For example, the identifier may include a specific memory address, a range of memory addresses, a location for the page in memory 108, a pointer to a memory address or location for the page, an index for the page in memory 108, and/or some other identifier. The eviction module 206, in certain embodiments, evicts the located or identified page from memory 108.

For instance, the eviction module 206 may flag one or more locations or addresses in memory 108 associated with the page identified to be evicted as invalid data, which may allow the flagged locations to be marked as free locations or address to be written over with new data. In another example, the eviction module 206 may mark a table entry, such as a page table entry, for the page identified to be evicted, or a pointer to the page identified to be evicted, as invalid such that new data is free to be written to the evicted page. In yet another example, the eviction module 208 may evict the page from memory 108 by overwriting the data of the page to be evicted from memory 108 with invalid data (e.g., all 0's, all 1's, or some other value that indicates invalid data). In a further example, the eviction module 208 may evict the identified page from memory by swapping the page to be evicted from memory 108 out of memory 108 and to a non-volatile storage device 110.

In some embodiments, the eviction module 206 requests the page identifier from the learning module 204/neural network 116 in response to a page fault. In such an embodiment, the identifier for the page to be evicted may be determined in real-time. For, example, in response to receiving the request for the page identifier, the learning module 204 may request state information from the state module 202. The state module 202 may then receive state information from the snooping device 114, the neural network 116 may perform machine learning operations on the state information to determine the identifier of the page to be evicted from memory 108, and the learning module 204 may send the determined identifier to the eviction module 206.

In other embodiments, described above, the neural network 116 may continuously update the identifier for the page to be evicted from memory 108 in response to receiving new state information from the state module 202. Accordingly, the learning module 204 can send or otherwise make available the most recently determined identifier for the page to be evicted from memory 108 to fulfill a request from the eviction module 206 for the identifier. In certain embodiments, the learning module 204/neural network 116 sends the identified page to the eviction module 206 at predefined intervals, e.g. when new state information is received and the neural network 116 updates the identifiers for the pages to be evicted based on the new state information.

Figure 3:
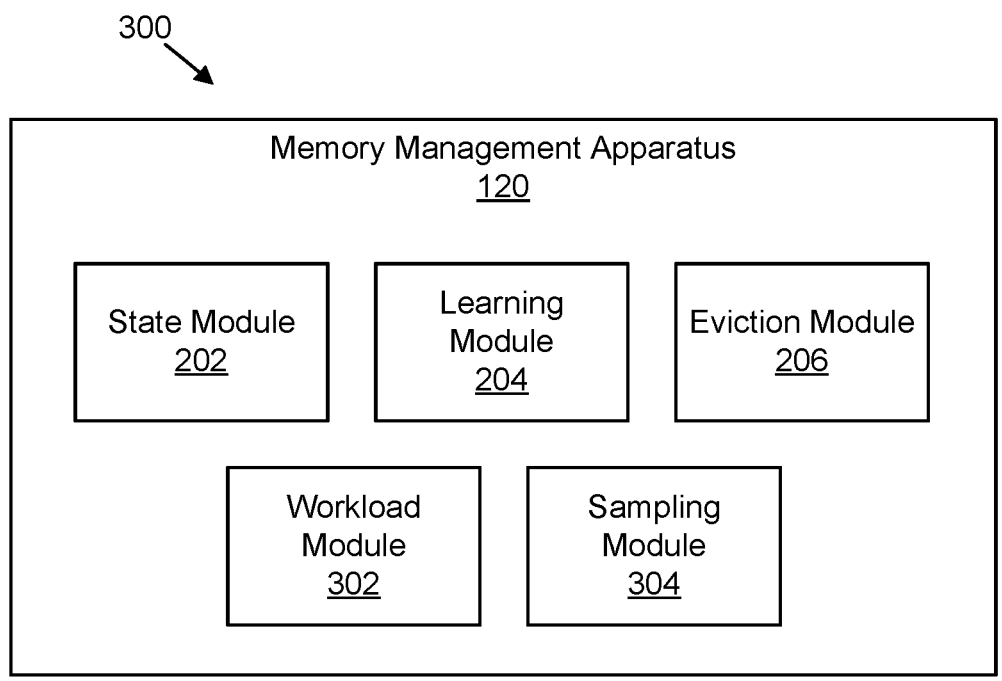
FIG. 3 is a schematic block diagram illustrating one embodiment of another apparatus for memory page eviction using a neural network in accordance with the subject matter disclosed herein.

FIG. 3 depicts one embodiment of another apparatus 300 for memory page eviction using a neural network. The apparatus 300 includes an instance of a memory management apparatus 120. The memory management apparatus 120 includes one or more of a state module 202, a learning module 204, and an eviction module 206, which may be substantially similar to the state module 202, the learning module 204, and the eviction module 206 described above with reference to FIG. 2. The memory management apparatus 120 also includes a workload module 302 and/or a sampling module 304, which are described in more detail below.

The workload module 302, in one embodiment, is configured to detect a change in a workload that is executing on the information handling device 102. In one embodiment, the neural network 116 may be trained on state information for a particular workload when the information handling device 102 is activated, turned-on, or the like. For example, the training data may include state information snooped by the snooping device 114 for a predetermined period of time after the workload is started to train and test learned functions, or other machine learning elements for predicting a page to evict from memory 108. Accordingly, as the information handling device 102 continues to execute the workload over time, the neural network 116 becomes more refined for the particular workload based on state information collected over time for the workload, e.g., the machine learning parameters, weights, or the like may not materially change after the workload has executed for a period of time or may be substantially optimized for the workload. However, if the workload module 302 detects that the workload has changed, then the neural network 116 may need to be retrained for the workload based on state information for the new workload, update its parameters/weights based on the workload, and/or the like because the new workload may access memory, storage, etc. or require different processing characteristics than the previous workload, which would generate materially different or new memory access transaction state information based on the interactions of the workload with the memory 108.

As used herein, a workload is an amount of work that is performed by an entity at a given time. The workload may refer to memory use, processor use, storage use, I/O use, and/or the like over a given amount of time. The workload may be based on the applications, services, and/or other processes that are executing on an information handling device 102. The workload module 302 may track various characteristics associated with a workload at a given point in time such as memory usage, processor performance, storage I/O, temperature, etc., to determine whether the current workload has changed, e.g., increase/decrease in memory usage, processor performance, storage I/O, temperature, etc. due to current processes being exited, new processes being initiated, or the like.

Accordingly, if the workload module 302 detects a change in the workload, the workload module 302 may enable the snooping device 114 (if it has been disabled) so that new state information based on the workload change can be snooped from the system bus 104. The state module 202 may send the new state information to the learning module 204 so that the neural network 116 can be re-trained with the new state information and/or update its weights. In some embodiments, after the neural network 116 has been sufficiently retrained, the workload module 302 may disable the snooping device 114 because it may not be necessary to continue snooping the system bus 1004 for state information until the workload module 302 detects another change in the workload.

In some embodiments, the workload module 302 determines a workload change in response to determining that the difference between previously measured performance levels and current performance levels satisfies a threshold. For example, if the workload module 302 determines that the difference between a previous memory access rate and a current memory access rate is above or below a threshold level, then then workload module 302 may determine that something has changed in the workload. Similarly, if the workload module 302 detects that an application that has been running for some time has exited, or that new applications have been executed, then the workload module 302 may determine that the workload has changed.

Accordingly, whenever the workload module 302 detects a change in the workload, or when the information handling device 102 is first activated, the neural network 116 may go through a "warming-up" period where the neural network 116 is trained for an amount of time on state information snooped on the system bus 104 until the neural network 116 is sufficiently trained for a particular workload. After the "warming-up" or training period, the neural network 116 may be substantially optimized for the workload, and the state module 202 may cease sending state information to the learning module 204 or may disable the snooping device 114 altogether until the workload module 302 detects a change in the currently executing workload, at which point the neural network 116 will be re-trained on new state information collected by the snooping device 114 from the system bus 104.

In one embodiment, the sampling module 304 determines an interval for sampling or snooping state information from the system bus 104 using the snooping device 114. In certain embodiments, the interval is determined based on the rate that pages are evicted from memory 108. For instance, the sampling module 304 may track how often a page fault occurs, which causes pages to be evicted from memory 108, and may set the sampling interval to be less than the rate that pages are evicted from memory 108.

In one embodiment, the sampling module 304 determines the sampling interval in real-time based on one or more performance characteristics of the information handling device 102, e.g., the system bus 104, the memory 108, the processor 106, and/or the like. For instance, the sampling module 304 may determine, in real-time, the page eviction rate for the memory 108 and may set the sampling rate for the snooping device 114 to be at least as often as the page eviction rate. In another example, the sample module 304 may determine, in real-time, the running clock-rate for the processor 106 and may set the sampling interval as a function of the determined clock rate. Accordingly, the learning module 204 may receive the state information at the determined intervals so that the neural network 116 can update and/or train itself on the snooped state information.

In this manner, the page of data in memory 108 that the neural network 116 identifies as being the next page to evict will be as up-to-date and accurate as possible for the given sampling rate and the performance characteristics of the information handling device 102.

Figure 4:
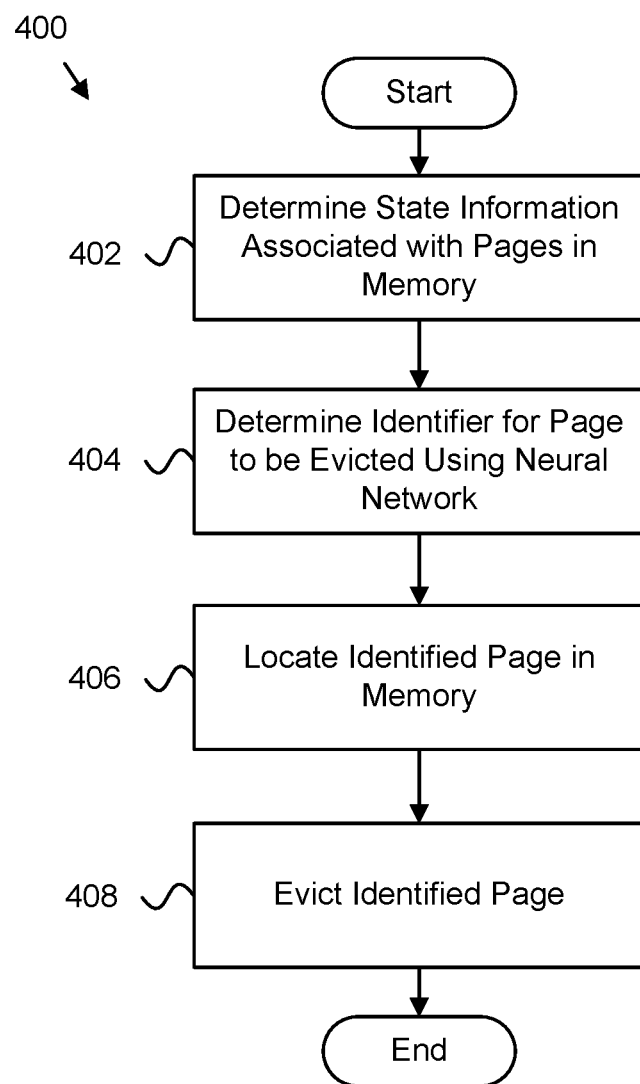
FIG. 4 is a schematic flow chart diagram illustrating one embodiment of a method for memory page eviction using a neural network in accordance with the subject matter disclosed herein.

FIG. 4 depicts one embodiment of a method 400 for memory page eviction using a neural network. In one embodiment, the method 400 begins and determines 402 state information related to evicting pages from memory 108 by using a dedicate hardware snooping device 114 that is configured to snoop a system bus 104 for the state information. In a further embodiment, the method 400 determines 404 an identifier for a page in memory 108 to be evicted using a neural network 116 that is configured to perform machine learning operations on the state information to identify the page in memory 108 to be evicted. In various embodiments, the method 400 locates 406 the identified page in memory 108 using the identifier determined by the neural network 116, and evicts 408 the identified page from memory 108, and the method 400 ends. In certain embodiments, the state module 202, the learning module 204, and the eviction module 206 perform the various steps of the method 400.

Figure 5:
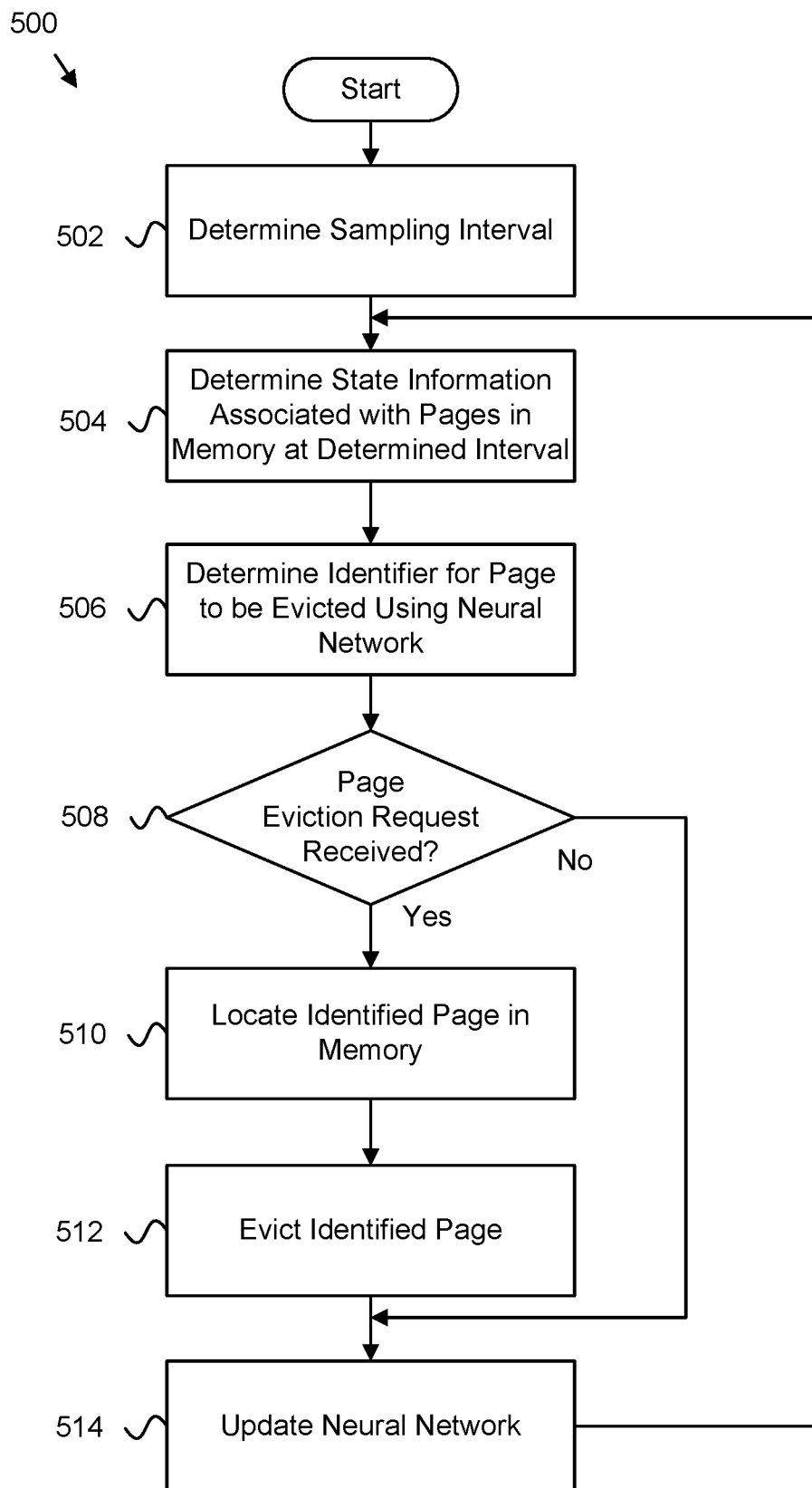
FIG. 5 is a schematic flow chart diagram illustrating one embodiment of another method for memory page eviction using a neural network in accordance with the subject matter disclosed herein.

FIG. 5 depicts one embodiment of a method 500 for memory page eviction using a neural network. In one embodiment, the method 500 begins and determines 502 a sampling interval for snooping the system bus 104, using the dedicated hardware snooping device 114, for state information related to evicting pages from memory 108. In a further embodiment, the method 500 determines 504 state information related to evicting pages from memory 108 by using the dedicate hardware snooping device 114 at the determined 502 sampling interval.

In certain embodiments, the method 500 determines 506 an identifier for a page in memory 108 to be evicted using a neural network 116 that is configured to perform machine learning operations on the state information to identify the page in memory 108 to be evicted. In one embodiment, the method 500 determines 508 whether a page eviction request has been received, for example, in response to a page fault. If so, in one embodiment, the method 500 locates 510 the identified page in memory 108 using the identifier determined by the neural network 116, and evicts 512 the identified page from memory 108. Otherwise, the method 500, in some embodiments, updates 514 and/or continues to train the neural network 116 with the determined 504 state information after the page, and continues to determine 504 state information from the system bus 104 at the determined interval. In certain embodiments, the state module 202, the learning module 204, the eviction module 206, and the sampling module 304 perform the various steps of the method 500.

Figure 6:
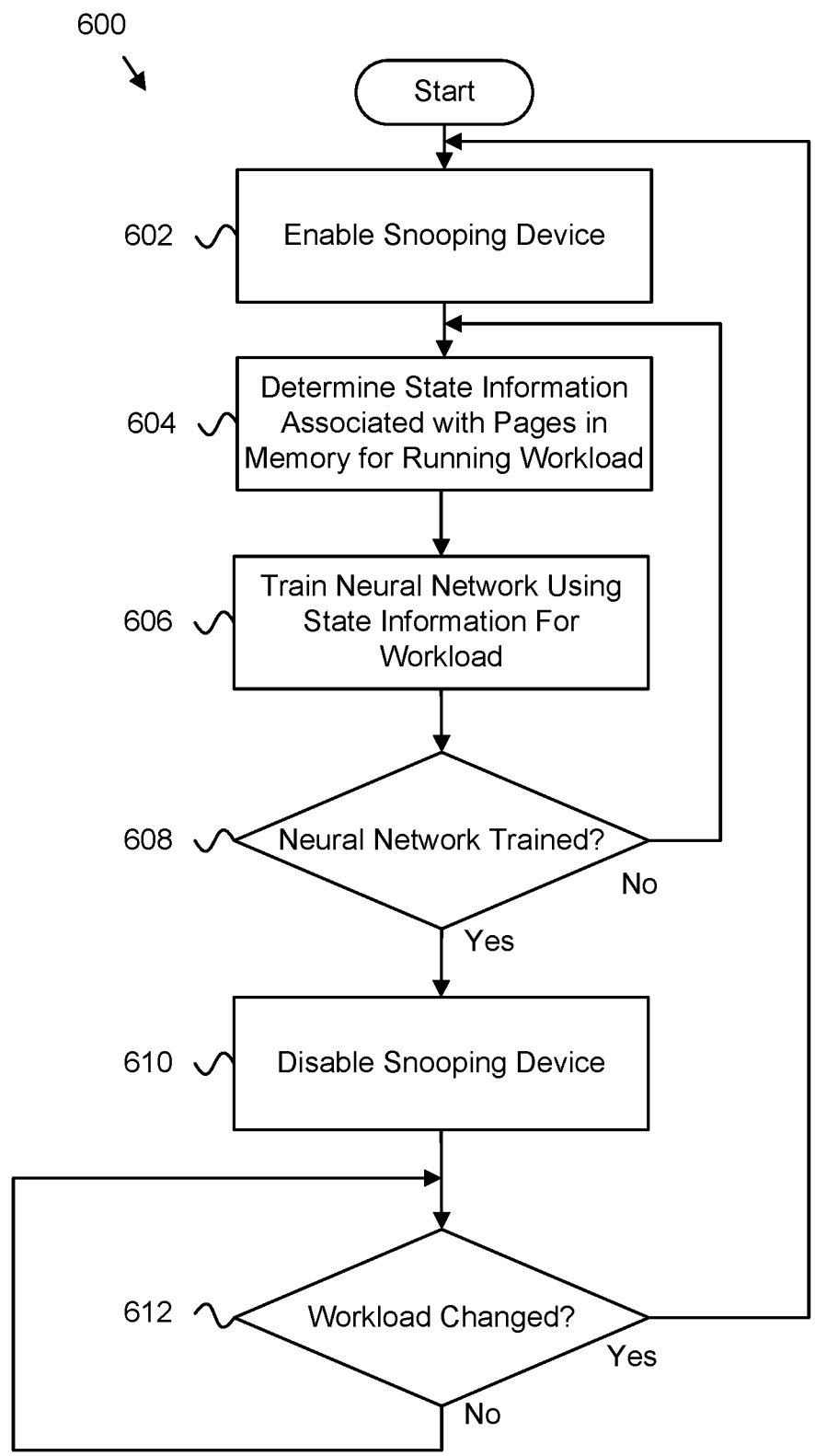
FIG. 6 is a schematic flow chart diagram illustrating one embodiment of yet another method for memory page eviction using a neural network in accordance with the subject matter disclosed herein.

FIG. 6 depicts one embodiment of a method 600 for memory page eviction using a neural network. In one embodiment, the method 600 begins and enables 602 a dedicated hardware snooping device 114. The method 600 may enable 602 the snooping device 114 when the system, e.g., the information handling device 102, starts up, is turned on, is activated, is enabled, and/or the like, when the workload changes, as described below, and/or the like. The method 600, in a further embodiment, determines 602 state information related to evicting pages from memory 108 by using the dedicate hardware snooping device 114 for the workload executing on the information handling device 102.

Based on the state information, the method 600 trains 606 the neural network 116 using the state information for the workload. For example, the method 600 may set of update the neural network's weights that correspond to the state information as it relates to evicting pages from memory 108. In certain embodiments, the method 600 determines 608 whether the neural network 116 has been sufficiently trained. If not, in one embodiment, the method 600 continues to determine 604 state information by snooping the system bus 104 using the dedicated hardware snooping device 114.

Otherwise, in certain embodiments, after the method 600 determines 608 that the neural network 116 has been sufficiently trained (e.g., after determining that weights do not change more than a threshold based on the new state information, after determining that the workload has executed for a predetermined amount of time without changing, and/or the like), the method 600 disables 610 the snooping device 114.

In one embodiment, the method 600 determines 612 whether the workload has changed. If so, then the method 600 enables 602 the dedicated hardware snooping device 114 to determine 604 new state information for the changed workload and train 606 the neural network 116 with the new state information. Otherwise, if the method 600 determines 612 that the workload has not changed, the method 600 continues checking for workload changes. In certain embodiments, the state module 202, the learning module 204, and the workload module 302 perform the various steps of the method 600.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a state module that determines state information related to evicting pages from memory, the state information determined by a dedicated hardware snooping device that snoops a system bus for the state information;
   a sampling module that determines an interval for snooping the system bus for state information using the dedicated hardware snooping device, the interval determined based on a rate of page eviction from memory, the state information sent to the neural network at the determined interval;
   a learning module that identifies an identifier for a page in memory to be evicted using a neural network, the neural network performing machine learning operations on the state information to identify the page in memory to be evicted; and
   an eviction module that:
   locates the identified page in memory using the identifier identified by the neural network; and
   evicts the identified page from memory,
   wherein at least a portion of said modules comprise one or more of hardware circuits, programmable hardware devices and executable code, the executable code stored on one or more computer readable storage media.

2. The apparatus of claim 1, wherein the state module enables the dedicated hardware snooping device in response to the system bus being enabled, the dedicated hardware snooping device snooping state information from the system bus until the system bus is disabled.

3. The apparatus of claim 1, wherein the learning module:
   continually trains the neural network on the state information in response to receiving the state information, the neural network identifying the page to evict from memory as a function of trends in historical state information and current state information snooped from the system bus; and
   continually updates the identifier for the page in memory to be evicted based on output from the neural network that is generated as a function of current state information that the state module determines using the dedicated hardware snooping device.

4. The apparatus of claim 1, wherein the state module enables the dedicated hardware snooping device for snooping state information from the system bus until the neural network has been trained using state information for a particular workload.

5. The apparatus of claim 4, further comprising a workload module that:
   detects a change in the workload;
   enables the dedicated hardware snooping device to snoop new state information from the system bus, wherein the neural network is re-trained using the new state information; and
   disables the dedicated hardware snooping device in response to the neural network being trained on the new state information.

6. The apparatus of claim 1, wherein the sampling module determines the interval in real-time based on one or more performance characteristics associated with one or more of the system bus, the memory, and a processor coupled to the memory.

7. The apparatus of claim 1, wherein the learning module updates the weights of the state information that the neural network uses to identify the identifier for the page in memory to be evicted in response to receiving the state information at the determined interval.

8. The apparatus of claim 1, wherein the dedicated hardware snooping device is a hardware accelerator that is separate from, but communicatively coupled to, a processor coupled to the system bus.

9. The apparatus of claim 1, wherein the dedicated hardware snooping device snoops the system bus for data of a predefined type that is associated with a memory transaction of the memory.

10. The apparatus of claim 1, wherein the neural network is a programmable hardware device that is communicatively coupled to one or more of the dedicated hardware snooping device and a processor, the programmable hardware device configured to perform the one or more machine learning operations.

11. The apparatus of claim 1, wherein the identifier identified by the neural network for the page in memory to be evicted comprises one or more of a memory location for the page to be evicted, a memory address for the page to be evicted, and a pointer to the page to be evicted.

12. The apparatus of claim 1, wherein the state information comprises information associated with a memory access transaction, the state information comprising one or more of a system time, a memory address, a memory command type, and a memory command destination.

13. The apparatus of claim 1, wherein the learning module further considers output from one or more predefined page eviction algorithms to identify the page to evict from memory, the predefined page eviction algorithms comprising one or more of:
   least recently used;
   most recently used;
   not recently used;
   first-in-first-out;

second chance; and
clock.

14. A system comprising:
a dedicated hardware snooping device;
a neural network;
a memory;
a system bus, wherein the dedicated hardware snooping device, the neural network, and the memory are communicatively coupled to one another over the system bus;
a state module that determines state information related to evicting pages from the memory, the state information determined by the dedicated hardware snooping device that snoops the system bus for the state information;
a sampling module that determines an interval for snooping the system bus for state information using the dedicated hardware snooping device, the interval determined based on a rate of page eviction from memory, the state information sent to the neural network at the determined interval;
a learning module that identifies an identifier for a page in the memory to be evicted using the neural network, the neural network performing machine learning operations on the state information to identify the page in the memory to be evicted;
an eviction module that:
locates the identified page in the memory using the identifier identified by the neural network; and
evicts the identified page from the memory,
wherein at least a portion of said modules comprise one or more of hardware circuits, programmable hardware devices and executable code, the executable code stored on one or more computer readable storage media.

* * * * *